(12) United States Patent
Tseng

(10) Patent No.: US 9,463,843 B2
(45) Date of Patent: Oct. 11, 2016

(54) STRADDLE-TYPE VEHICLE

(71) Applicant: YAMAHA HATSUDOKI KABUSHIKI KAISHA, Iwata-shi, Shizuoka-ken (JP)

(72) Inventor: Yuan Tseng, Chunli (TW)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 0 days.

(21) Appl. No.: 14/805,463

(22) Filed: Jul. 21, 2015

(65) Prior Publication Data
US 2016/0114857 A1 Apr. 28, 2016

(30) Foreign Application Priority Data

Oct. 24, 2014 (CN) .......................... 2014 1 0575178

(51) Int. Cl.
| | | |
|---|---|---|
| *B62M 7/06* | (2006.01) | |
| *B62J 17/00* | (2006.01) | |
| *B62J 25/00* | (2006.01) | |
| *B62J 1/00* | (2006.01) | |
| *B62K 11/04* | (2006.01) | |

(52) U.S. Cl.
CPC . *B62M 7/06* (2013.01); *B62J 1/00* (2013.01); *B62J 17/00* (2013.01); *B62J 25/00* (2013.01); *B62K 11/04* (2013.01); *B62K 2202/00* (2013.01)

(58) Field of Classification Search
CPC ............ B62M 7/06; B62J 1/00; B62J 17/00; B62J 25/00; B62K 11/04; B62K 2202/00
USPC ....................................................... 180/219
See application file for complete search history.

(56) References Cited

U.S. PATENT DOCUMENTS

| | | | | | |
|---|---|---|---|---|---|
| 4,487,283 | A | * | 12/1984 | Suzuki ..................... | B62J 17/00 180/219 |
| 4,498,700 | A | * | 2/1985 | Fujii ........................ | B62J 17/00 296/208 |
| 4,696,364 | A | * | 9/1987 | Enoki ...................... | B62M 7/06 180/228 |
| 4,715,465 | A | * | 12/1987 | Takahashi ................ | B62J 17/00 180/219 |
| 4,964,483 | A | * | 10/1990 | Yokoyama ............... | B62J 35/00 180/219 |
| 7,300,101 | B2 | * | 11/2007 | Ohzono ................... | B62J 17/02 296/181.2 |
| 2008/0023242 | A1 | * | 1/2008 | Lachapelle .............. | B62J 15/00 180/210 |

FOREIGN PATENT DOCUMENTS

| | | |
|---|---|---|
| TW | I400172 B | 7/2013 |
| TW | I421190 B | 1/2014 |

* cited by examiner

*Primary Examiner* — Joseph Rocca
*Assistant Examiner* — Felicia L Brittman
(74) *Attorney, Agent, or Firm* — Rabin & Berdo, P.C.

(57) ABSTRACT

Disclosed is a straddle-type vehicle including a seat cushion, a foot rest lever, and a vehicle shell. The vehicle shell includes a foot pedal and a back shell portion connected to each other. The back shell portion includes a central cover portion, a front side cover portion, a bearing cover portion, and a back side cover portion. The front side cover portion has an upper portion and a lower portion. A front end portion of the upper portion is located further forward than a back end portion of the lower portion. The bearing cover portion has a bearing face for bearing the foot rest lever. An imaginary extension line extending from the bearing face passes through the seat cushion.

11 Claims, 11 Drawing Sheets

STRADDLE-TYPE VEHICLE

CROSS-REFERENCE TO RELATED APPLICATION

This application is based on, and claims priority to Chinese Patent Application No. 201410575178.9, filed on Oct. 24, 2014, the contents of which are incorporated herein by reference.

DESCRIPTION

1. Technical Field

The present invention relates to a straddle-type vehicle, and in particular, to a scooter-type straddle-type vehicle.

2. Background Art

In the past, a straddle-type vehicle such as a scooter-type, has typically utilized a tandem foot rest of a co-rider disposed at a position corresponding to a riding posture of the co-rider according to the size of the vehicle, and specifically, to the height of a seat cushion.

In patent document 1, a small scooter-type vehicle is disclosed. Referring to FIG. 16 in the patent document 1, a fourth cover member 44 forms a part of left and right sides of a side cover 20d and a foot rest portion 21a. Specifically, a right side of the fourth cover member 44 is formed with a recess 44a recessed inwards in a width direction of the vehicle. A bottom face of the recess 44a forms a step 22c provided with a back foot pedal 18a. The recess 44a and the step 22c extend towards the front of the vehicle and are connected to the foot rest portion 21a. Therefore, the pivots of the back foot pedals 18a and 18b are located above the step 22c and outside the recess 44a, either in an expanded state or in a received state.

In patent document 2, a small scooter-type vehicle is disclosed. Referring to FIG. 1 in the patent document 2, a scooter-type vehicle 1 includes a left and right side cover 9. A receiving hole (not shown) is disposed in the left and right side cover 9 at a position corresponding to a folding foot rest lever mechanism 30, thereby receiving the folding foot rest lever mechanism 30 in the received state in the receiving hole, so that the vehicle body of the scooter-type vehicle 1 appears to be flush. A foot pedal 5 is connected to the left and right side cover 9 at two sides and located before the folding foot rest lever mechanism 30. Therefore, it can be known that a pivot of the folding foot rest lever mechanism 30 is located inside the receiving hole of the left and right side cover 9, either in an expanded state or in a received state.

PRIOR ART DOCUMENTS

Patent Documents

Patent document 1: Taiwan patent publication No. 1421190
Patent document 2: Taiwan patent publication No. 1400172

SUMMARY OF THE INVENTION

Problems to be Solved by the Present Invention

In the foregoing patent document 1, the pivots of the back foot pedals 18a and 18b are located above the step 22c and outside the recess 44a, so most of the body is exposed. Therefore, the operation for receiving or expanding the back foot pedals 18a and 18b becomes easy, and maintain good operability. Although the back foot pedals 18a and 18b can provide the effect of good operability, when the feet of a co-rider rest on the back foot pedals 18a and 18b, the feet of the co-rider are in a position far away from a left and right side cover 20d so that the feet of the co-rider are not easily located closely against the left and right side cover 20d, this typically results in poor comfort for the co-rider.

Also, in the foregoing patent document 2, since the pivot of the folding foot rest lever mechanism 30 is located in the receiving hole of the left and right side cover 9, when feet of a co-rider rest on the folding foot rest lever mechanism 30, the feet of the co-rider are in a position close to the left and right side cover 9, so that the feet are easily located closely against the left and right side cover 9 near the feet. That is, the feet have good bearing comfort. However, the folding foot rest lever mechanism 30 is fixed in the receiving hole without exposure of the pivot, so the whole body is embedded in the receiving hole in the received state. Therefore, it is difficult to expand the folding foot rest lever mechanism 30 from the received state where the whole body is embedded in the receiving hole. That is, the operability is poor.

Technical Means for Solving the Problems

A straddle-type vehicle of the present invention comprises a body frame, a power unit, a seat cushion, a foot rest lever, and a vehicle shell. The power unit is freely and swingably supported upon the body frame. The seat cushion is located higher than the power unit. The foot rest lever is supported on the body frame, is rotatable about a pivot, and has a foot carrying face which is switchable between a received state and an expanded state. The vehicle shell covers the body frame and includes a foot pedal and a back shell portion. The foot pedal is located before and below the seat cushion and before the power unit. The back shell portion is connected to a back edge of the foot pedal.

When the straddle-type vehicle is viewed sideways, the back shell portion of the straddle-type vehicle of the present invention is located below the seat cushion in a manner of dividing the space below the seat cushion. The back shell portion includes a central cover portion, a front side cover portion, a bearing cover portion, and a back side cover portion. The central cover portion is connected to the back edge of the foot pedal. When the straddle-type vehicle is viewed downward, a center of a front edge of the central cover portion is located further forward in the front-back direction of the straddle-type vehicle, while two ends of the front edge of the central cover portion are located further backward in front-back direction of the straddle-type vehicle. When the straddle-type vehicle is viewed sideways, the front side cover portion is located behind the central cover portion and extends from a lower end of the seat cushion until further downward than an upper end portion of the power unit in the up-down direction of the straddle-type vehicle. A front end portion of an upper portion of the front side cover portion is located further forward than a back end portion of a lower portion of the front side cover portion in the front-back direction of the straddle-type vehicle. When the straddle-type vehicle is viewed downward, the upper portion of the front side cover portion is located further inward than the lower portion of the front side cover portion in the in the left-right direction of the straddle-type vehicle. When the straddle-type vehicle is viewed downward, the bearing cover portion is connected between a lower side edge (a left lower side edge in an example of a left side of the straddle-type vehicle) of the central cover portion and a front edge of the lower portion of the front side cover portion by extending in the left-right direction of the straddle-type vehicle, and has a bearing face for bearing the foot rest lever and facing the up direction of the straddle-type vehicle. When the straddle-type vehicle is viewed sideways, an imaginary extension line extending from the bearing face passes through the seat cushion. When the straddle-type vehicle is viewed sideways, a lower edge of the back side cover portion is located above the power unit and extends backward from a back edge of the upper portion of the front side cover portion.

In the straddle-type vehicle of the present invention, preferably, when the straddle-type vehicle is viewed sideways, the width of the lower portion of the front side cover portion in the front-back direction of the straddle-type vehicle gets greater from a lower end to an upper end.

In the straddle-type vehicle of the present invention, preferably, a surface of the lower portion of the front side cover portion is of a concave-convex shape.

In the straddle-type vehicle of the present invention, preferably, when the straddle-type vehicle is viewed sideways, a front edge of the upper portion of the front side cover portion substantially obliquely extends backward and downward (that is, toward the down-and-back direction) from the seat cushion in the up-down direction of the straddle-type vehicle and the front-back direction of the straddle-type vehicle. The front edge of the lower portion of the front side cover portion substantially and obliquely extends forward and downward (that is, toward the down-and-front direction) from the upper portion of the front side cover portion in the up-down direction of the straddle-type vehicle and the front-back direction of the straddle-type vehicle and is connected to the back edge of the foot pedal.

In the straddle-type vehicle of the present invention, preferably, when the straddle-type vehicle is viewed downward, a front end portion of the upper portion of the front side cover portion is located further inward than a back end portion of the upper portion of the front side cover portion in the left-right direction of the straddle-type vehicle, and the front end portion of the upper portion of the front side cover portion is located further inward than the front edge of the lower portion of the front side cover portion in the left-right direction of the straddle-type vehicle.

In the straddle-type vehicle of the present invention, preferably, when the straddle-type vehicle is viewed downward, the bearing cover portion is located further outward than an outer edge portion of a front portion of the upper portion of the front side cover portion in the left-right direction of the straddle-type vehicle.

In the straddle-type vehicle of the present invention, preferably, when the straddle-type vehicle is viewed downward, the foot rest lever is located further outward than the upper portion of the front side cover portion in the left-right direction of the straddle-type vehicle.

In the straddle-type vehicle of the present invention, preferably, the foot rest lever has a pivotal connection portion and the pivotal connection portion is disposed on the bearing face. When the straddle-type vehicle is viewed downward, the pivotal connection portion is located further inward than an outer edge portion of the lower portion of the front side cover portion in the left-right direction of the straddle-type vehicle.

In the straddle-type vehicle of the present invention, preferably, the back edge of the upper portion of the front side cover portion is connected to a front edge of the back side cover portion to form a segment difference. When the straddle-type vehicle is viewed downward, the upper portion of the front side cover portion is located further outward than the back side cover portion in the left-right direction of the straddle-type vehicle.

In the straddle-type vehicle of the present invention, preferably, in the case that the foot rest lever is in the received state, when the straddle-type vehicle is viewed sideways, the height of the foot rest lever in the up-down direction of the straddle-type vehicle is greater than the length of the foot rest lever in the front-back direction of the straddle-type vehicle.

In the straddle-type vehicle of the present invention, preferably, when the foot rest lever is in the received state, the foot rest lever is located above the bearing face and is substantially parallel to the bearing face.

Effects of the Invention

The present invention is made in view of the foregoing problems, and is intended to provide a straddle-type vehicle, wherein the back shell portion of the straddle-type vehicle can take account of both the operability of the foot rest lever and the foot bearing comfort.

DETAILED DESCRIPTION OF THE PREFERRED EMBODIMENTS

Embodiments of the present invention are described below with reference to accompanying drawings. Also, for clear illustration, many practical details will be described in the following description. However, it should be understood that the practical details are not intended to limit the present invention. That is, in some embodiments of the present invention, the practical details are not necessary. Furthermore, in order to simplify the accompanying drawings, some structures and components known in the prior art are simply and schematically shown in the accompanying drawings.

Figure 1A:
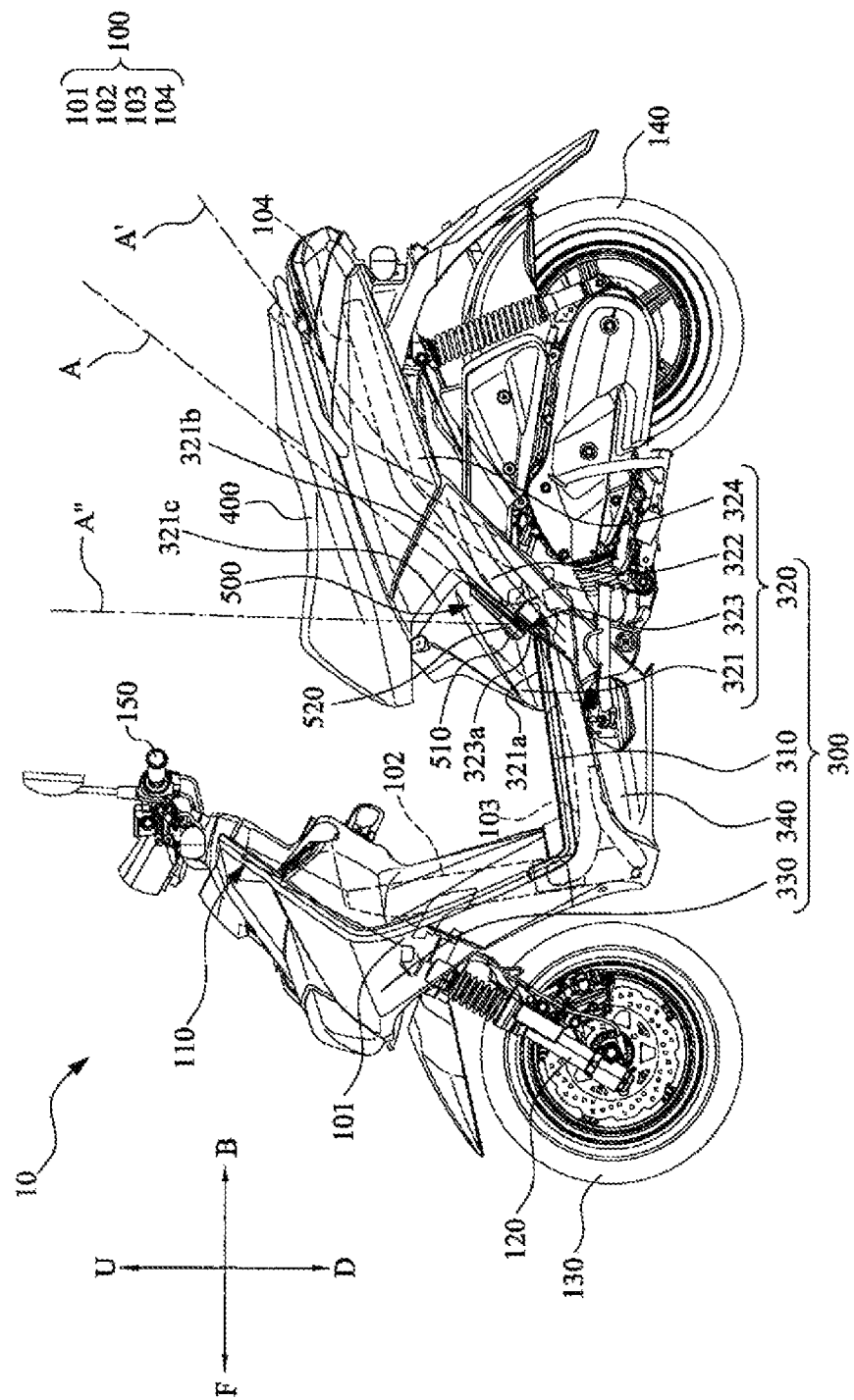
FIG. 1A is a side view of a straddle-type vehicle according to an embodiment of the present invention.
Figure 1B:
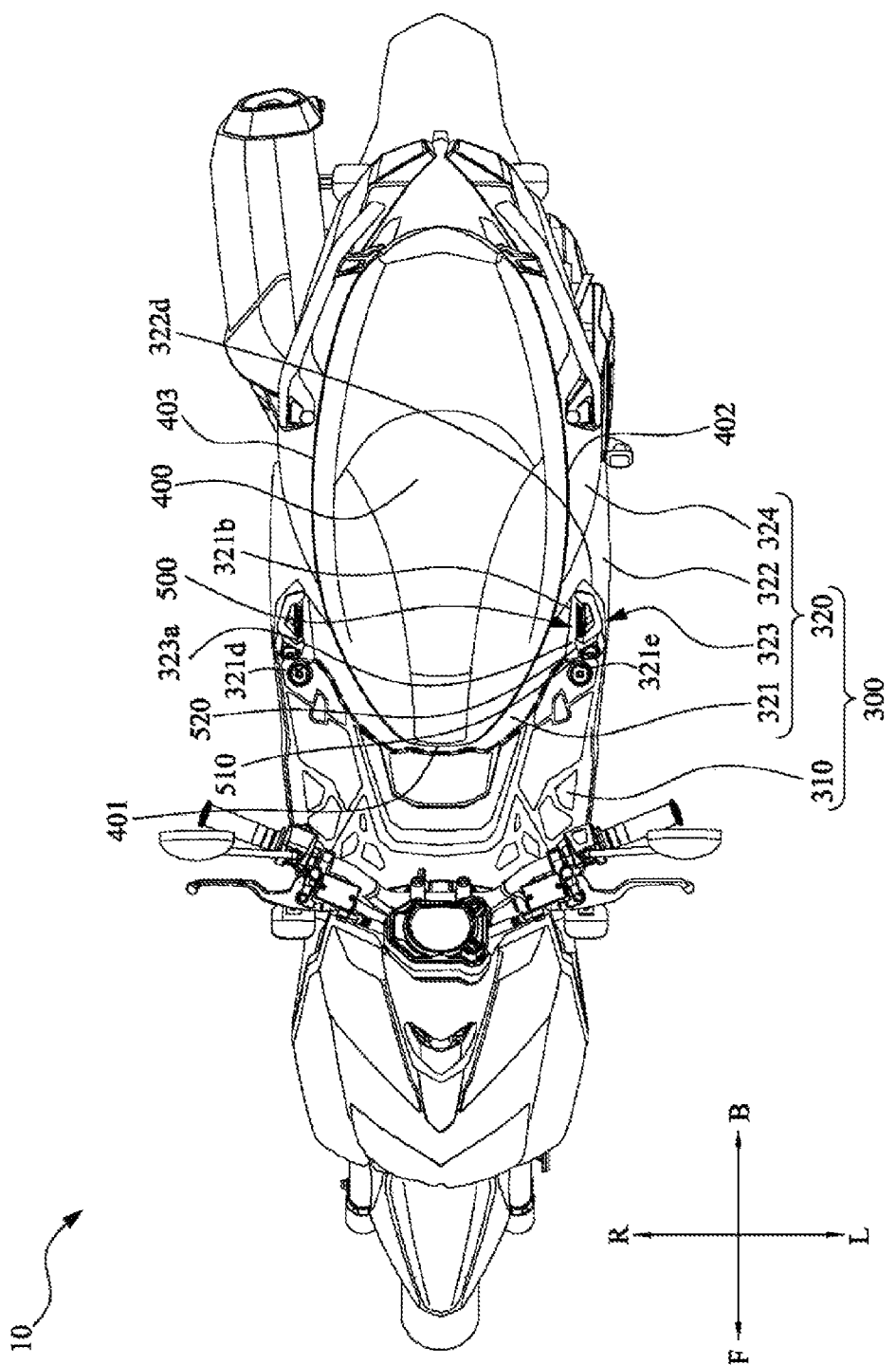
FIG. 1B is a top view of the straddle-type vehicle in FIG. 1A.
Figure 2:
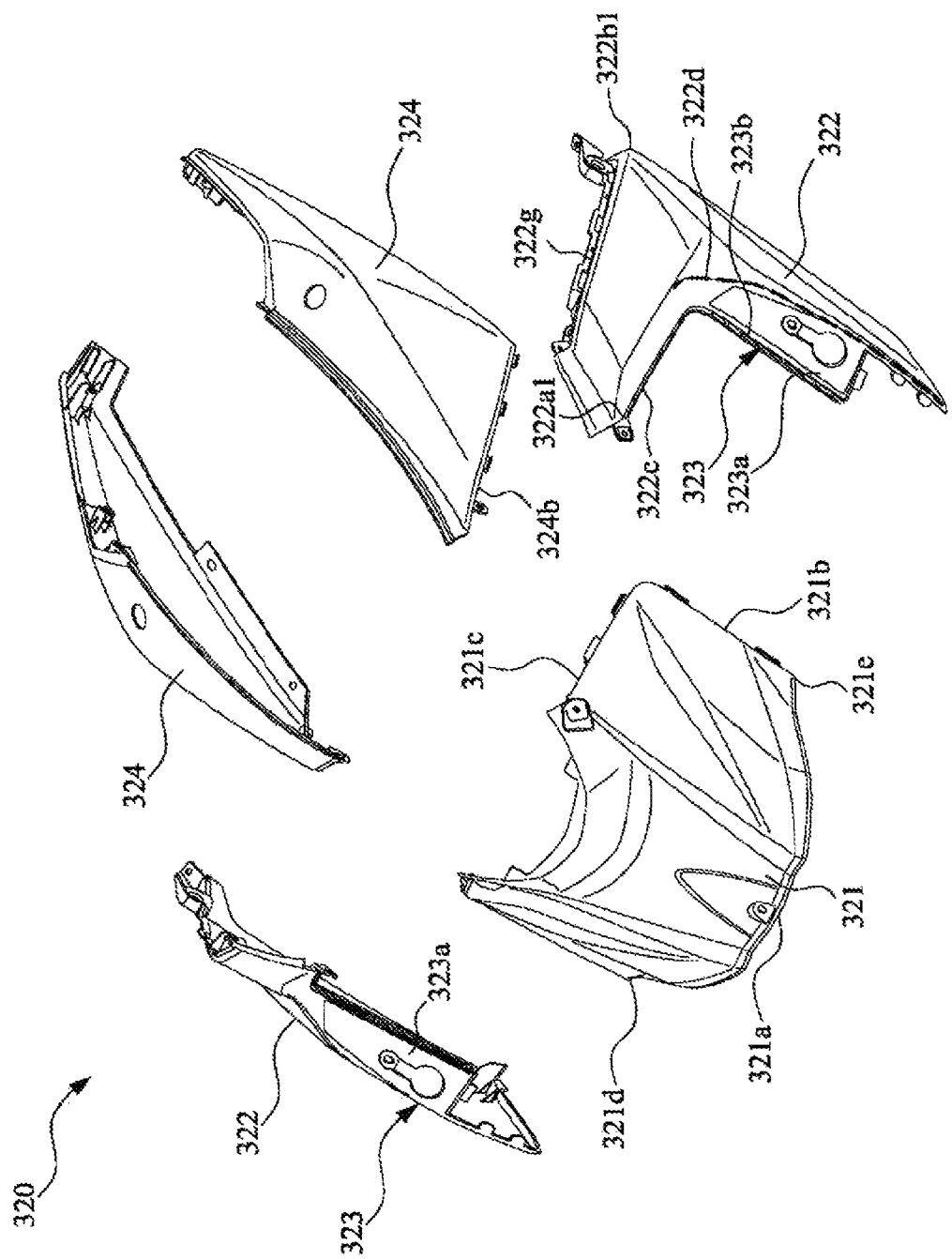
FIG. 2 is an exploded perspective view of a back shell portion as shown in FIG. 1A.
Figure 3:
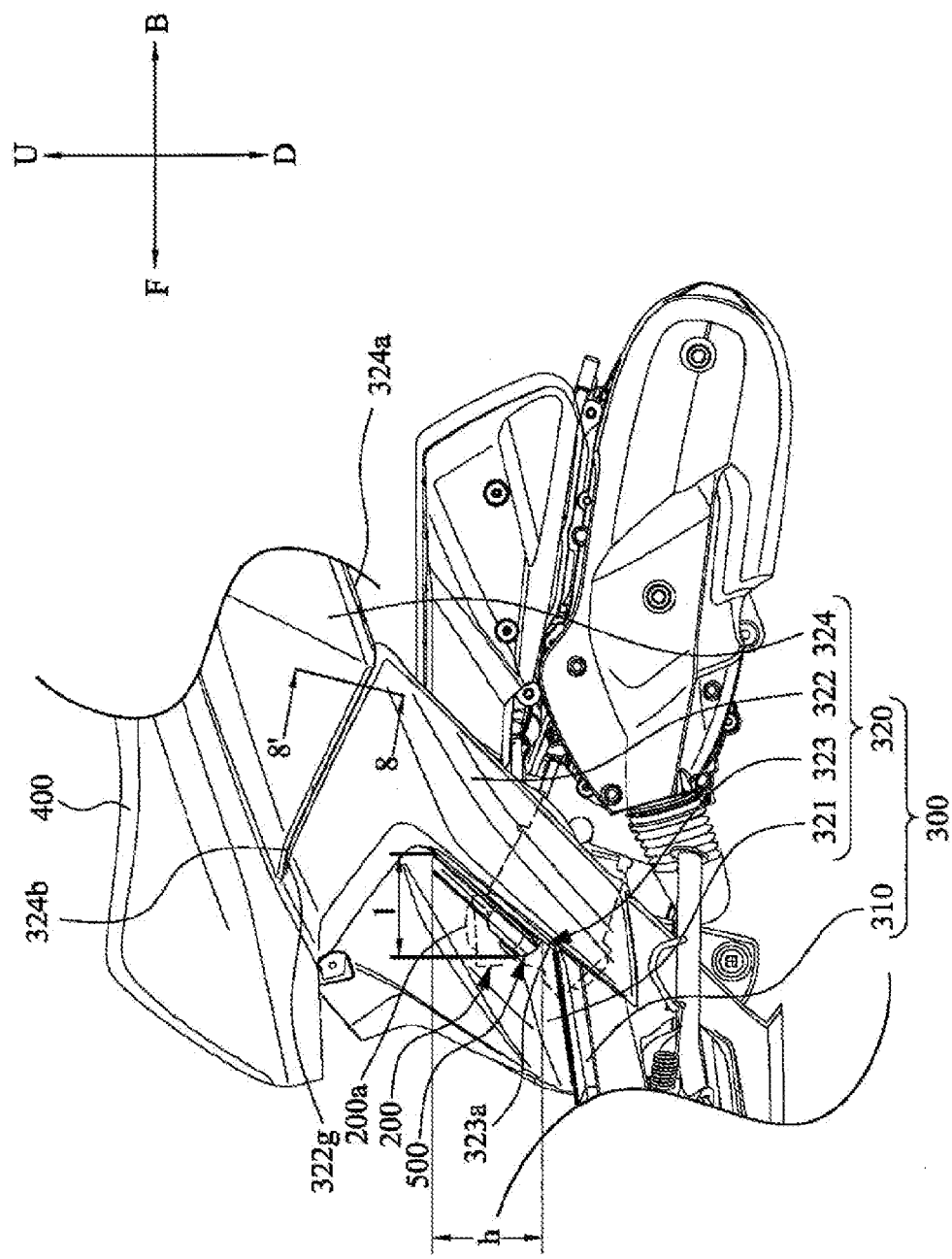
FIG. 3 is a side view of a part of FIG. 1A.
Figure 4B:
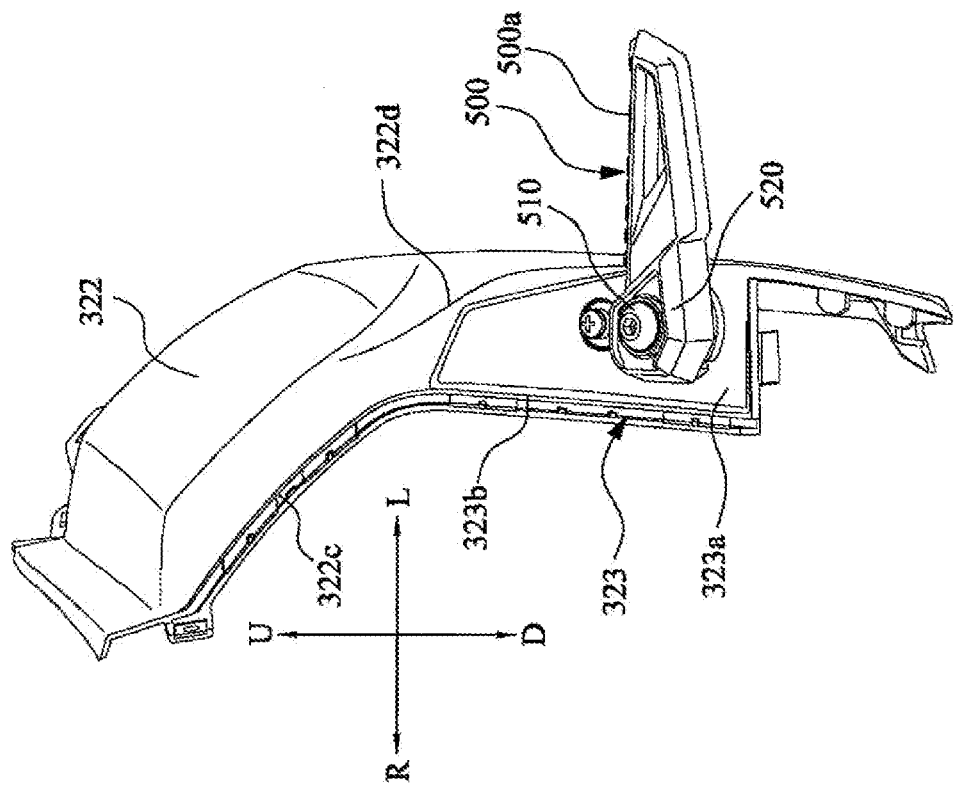
FIG. 4B is a front view similar to FIG. 4A, but with the foot rest lever being in an expanded state.
Figure 4A:
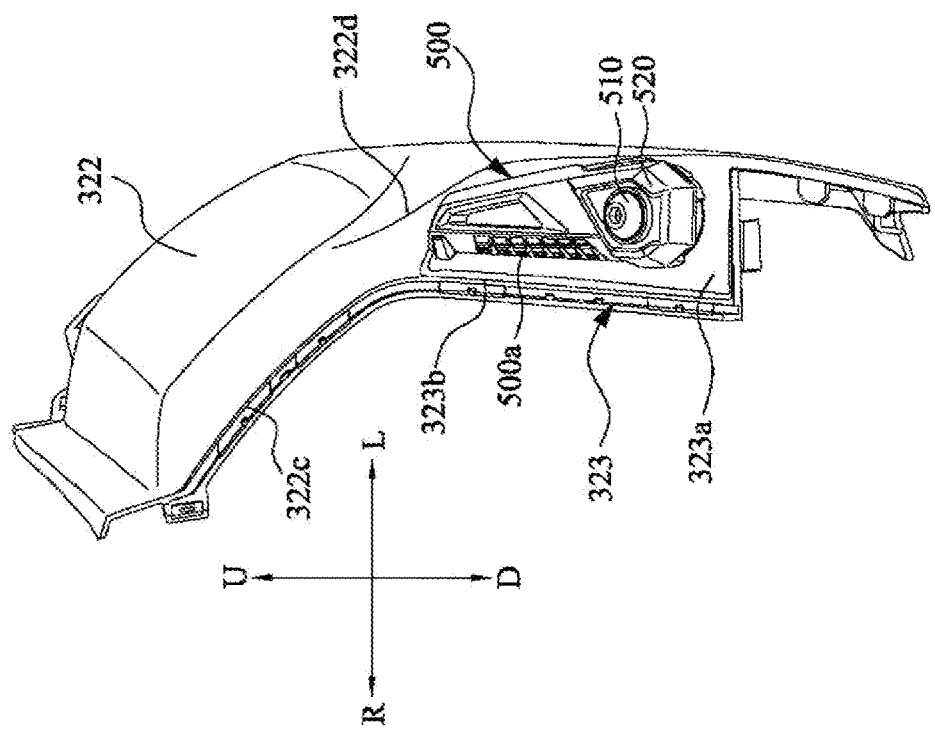
FIG. 4A is a front view of a front side cover portion, a bearing cover portion, and a foot rest lever in FIG. 1A, with the foot rest lever being in a received state.

Reference is made to FIG. 1A, FIG. 1B, FIG. 2, FIG. 3, FIG. 4A, and FIG. 4B. FIG. 1A is a side view of a straddle-type vehicle 10 according to an embodiment of the present invention. FIG. 1B is a top view of the straddle-type vehicle 10 in FIG. 1A. FIG. 2 is an exploded perspective view of a back shell portion 320 as shown in FIG. 1A. FIG. 3 is a side view of a part of FIG. 1A. FIG. 4A is a front view of a front side cover portion 322, a bearing cover portion 323, and a foot rest lever 500 in FIG. 1A, with the foot rest lever 500 being in a received state. FIG. 4B is a front view similar to FIG. 4A, but with the foot rest lever 500 being in an expanded state.

In the following description, front, back, left, right, up, and down directions refer to the front, back, left, right, up, and down directions viewed by a rider riding on the straddle-type vehicle 10. Furthermore, in FIG. 1A, the symbol U represents the up direction, the symbol D represents the down direction, the symbol F represents the front direction, and the symbol B represents the back direction. In FIG. 1B, the symbol R represents the right direction and the symbol L represents the left direction.

<Overview>

As shown in FIG. 1A to FIG. 4B, the straddle-type vehicle 10 in this embodiment comprises a body frame 100, a steering shaft 110, a front fork 120, a front wheel 130, a power unit 200 (shown by a dotted line in FIG. 3), a seat cushion 400, a foot rest lever 500, a back wheel 140, and a vehicle shell 300.

<Body Frame>

A body frame 100 is formed by a pipe made of iron. The body frame 100 is provided with a head pipe portion 101, a lower frame portion 102 (shown by a dotted line in FIG. 1A), a bottom frame portion 103 (shown by a dotted line in FIG. 1A), and a back frame portion 104 (shown by a dotted line in FIG. 1A). Furthermore, the body frame 100 can be formed integrally through a bending process or can be integrated by welding a plurality of parts.

The head pipe portion 101 is located in the center of the straddle-type vehicle in a width direction of the vehicle. The steering shaft 110 is rotatably inserted into the head pipe portion 101. An upper portion of the steering shaft 110 is connected with a handle portion 150. A lower portion of the steering shaft 110 is connected with a front fork 120. The front wheel 130 is rotatably supported by the front fork 120. The lower frame portion 102 is connected to the head pipe portion 101. The lower frame portion 102 extends downward from the head pipe portion 101. The bottom frame portion 103 is connected to a lower end portion of the lower frame portion 102. The bottom frame portion 103 extends backward from the lower frame portion 102. The back frame portion 104 is connected to a back end portion of the bottom frame portion 103. The back frame portion 104 obliquely extends backward and upward from the back end portion of the bottom frame portion 103.

<Seat Cushion>

The seat cushion 400 is supported on the body frame 100. The seat cushion 400 is arranged above the back frame portion 104. The seat cushion 400 is located further backward than the head pipe portion 101. The seat cushion 400 is supported on the back frame portion 104 via a receiving portion (not shown). Furthermore, the seat cushion 400 may not be directly mounted on the body frame 100, but is supported on the body frame 100 via another member, and, of course, may also be directly mounted on the body frame 100. As shown in FIG. 1B, the seat cushion 400 includes a front edge portion 401, a left side edge portion 402, and a right side edge portion 403. The front edge portion 401 is located further forward than the left side edge portion 402 and the right side edge portion 403. The left side edge portion 402 obliquely extends leftward and backward from the front edge portion 401. The right side edge portion 403 obliquely extends rightward and backward from the front edge portion 401.

<Power Unit>

The power unit 200 (shown by a dotted line in FIG. 3) is arranged below the seat cushion 400. The power unit 200 is supported on the body frame 100. The power unit 200 is swingably mounted on the body frame 100 via a stand. The power unit 200 has an output shaft (not shown). The back wheel 140 is rotatably supported by the output shaft. The power unit 200 and the back wheel 140 are formed in a unit swing manner in which they are swingable together relative to the body frame 100. The power unit 200 includes an engine as a driving source. However, the power unit 200 of the present invention can have a motor as the driving source instead of an engine, as long as it can be freely swingably supported on the body frame. The driving source is not specifically limited.

<Foot Rest Lever>

The foot rest lever 500 is supported on the body frame 100 in such a manner that the foot rest lever 500 is rotatable about a pivot 510. Furthermore, the foot rest lever 500 may not be directly mounted on the body frame 100, but is supported on the body frame 100 via another member, and, of course, may also be directly mounted on the body frame 100, so long as the foot rest lever 500 is rotatable about the pivot 510. The foot rest lever 500 is supported on the body frame 100 in such a manner that the foot rest lever 500 is switchable between the received state (shown in FIG. 4A) and the expanded state (shown in FIG. 4B). The foot rest lever 500 rotates about the pivot 510 so that the foot rest lever 500 is switchable between the received state and the expanded state. Herein, the so-called received state is a state in which the foot rest lever 500 is not used. The so-called expanded state is a state in which the foot rest lever 500 can be used. The foot rest lever 500 has a foot carrying face 500a and a pivotal connection portion 520. The foot carrying face 500a in the expanded state is a face for a co-rider riding on the seat cushion 400 to place the feet on. The pivotal connection portion 520 has an opening for the pivot 510 to pass through. The pivot 510 is supported by the pivotal connection portion 520. The foot rest lever 500 in the received state is arranged such that the foot carrying face 500a is located further upward than the pivot 510. In the received state, the foot rest lever 500 is configured to be within the width of the vehicle shell 300 in the left-right direction. That is, in the received state, the foot rest lever 500 is entirely arranged above a bearing face 323a of the bearing cover portion 323 of the vehicle shell 300. In the received state, the foot carrying face 500a of the foot rest lever 500 is arranged outside the vehicle shell 300 in the left-right direction. That is, when changing from the received state to the expanded state, the foot rest lever 500 rotates about the pivot 510 orthogonal to the bearing face 323a of the bearing cover portion 323 of the vehicle shell 300, so that the carrying face 500a extends outward in the width direction of the vehicle shell 300 in the left-right direction. Therefore, the foot carrying face 500a of the foot rest lever 500 departs from above the bearing face 323a of the bearing cover portion 323 of the vehicle shell 300 and is moved to a position suitable for supporting the feet of the co-rider.

<Vehicle Shell>

As shown in FIG. 1A, the vehicle shell 300 includes a front shell portion 330, a back shell portion 320, and a bottom shell portion 340. The front shell portion 330 mainly covers the periphery of the head pipe portion 101 and the lower frame portion 102. The back shell portion 320 is located below the seat cushion 400. The back shell portion 320 covers the front and two sides of the back frame portion 104. Hereinafter, the back shell portion 320 is described in detail. The bottom shell portion 340 is located between the front shell portion 330 and the back shell portion 320 in the front-back direction. The bottom shell portion 340 connects the front shell portion 330 and the back shell portion 320. The bottom shell portion 340 includes a foot pedal 310.

The foot pedal 310 is located between the front wheel 130 and the seat cushion 400 in the front-back direction. The foot pedal 310 is arranged further forward and downward than the seat cushion 400. The foot pedal 310 is arranged before the power unit 200. The foot pedal 310 is a face for carrying feet of a rider riding on the seat cushion 400 during travel. The foot pedal 310 is located above the bottom frame portion 103. The foot pedal 310 is located between the lower frame portion 102 and the back frame portion 104 in the front-back direction. The foot pedal 310 is flatly formed across the width direction of the vehicle. Herein, the so-called "flat foot pedal 310" means that any part of a foot carrying portion for the rider has a flatness such that the feet can be carried. That is, a concave-convex structure, for example, for slip resistance may also be formed on the foot pedal 310. Furthermore, in the present invention, the foot pedal 310 is not limited to the flat structure, as long as the foot pedal 310 enables the rider to place the feet thereon. For example, a center of the foot pedal 310 in the left-right direction may also be located further upward than sides of the foot pedal 310 in the left-right direction.

<Back Shell Portion>

As shown in FIG. 1A, when the straddle-type vehicle 10 is viewed sideways, the back shell portion 320 is located below the seat cushion 400 in a manner of dividing the space below the seat cushion 400. Also, the back shell portion 320 includes a central cover portion 321, a front side cover portion 322, a bearing cover portion 323, and a back side cover portion 324. As shown in FIG. 1B, the central cover portion 321 is connected to a back edge of the foot pedal 310 (the connection position is shown by a dotted line in FIG. 1B). Specifically, as shown in FIG. 2, a front edge 321a of the central cover portion 321 is a curve between a right end 321d and a left end 321e of the front edge 321a of the central cover portion 321. As shown in FIG. 1B, the back edge of the foot pedal 310 is connected to the front edge 321a of the central cover portion 321. Also, the central cover portion 321 is connected to not only a back edge of the foot pedal 310 on outer sides (located at left and right ends of the front edge 321a of the central cover portion 321), but also a back edge on an inner side that is located further inward than of the outer sides of the foot pedal 310 (located in a center of the front edge 321a of the central cover portion 321).

As shown in FIG. 1A and FIG. 2, the central cover portion 321 has the front edge 321a, a left lower side edge 321b, a left upper side edge 321c, a right lower side edge (not shown), and a right upper side edge (not shown). Also, the left lower side edge 321b and the left upper side edge 321c of the central cover portion 321 are symmetrical with the right lower side edge and the right upper side edge of the central cover portion 321 in the left and right direction. As described in detail, the central cover portion 321 is connected to the front side cover portions 322 at the left and right sides by the left lower side edge 321b, the left upper side edge 321c, the right lower side edge, and the right upper side edge. Therefore, the left lower side edge 321b obliquely extends backward and upward similarly to a side edge 323b of the bearing cover portion 323, and the left upper side edge 321c obliquely extends backward and downward similarly to a front edge 322c of an upper portion 322a of the front side cover portion 322. The right lower side edge and the right upper side edge are symmetrical with the left lower side edge 321b and left upper side edge 321c in the left and right direction, and thus their description is omitted.

As shown in FIG. 1B, when the straddle-type vehicle 10 is viewed downward, the center of the front edge 321a of the central cover portion 321 is located further forward than the right and left ends 321d and 321e of the front edge 321a of the central cover portion 321 in the front-back direction F-B of the straddle-type vehicle 10. That is, the front edge 321a of the central cover portion 321 extends backward in the front-back direction F-B of the straddle-type vehicle 10 and extends towards two sides from the center in the left-right direction L-R of the straddle-type vehicle 10.

Also, as shown in FIG. 3, when the straddle-type vehicle 10 is viewed sideways, the front side cover portion 322 is located behind or further rearward of the central cover portion 321 in the front-back direction F-B of the straddle-type vehicle 10. The front side cover portion 322 extends from a lower end of the seat cushion 400 until further downward than an upper end portion 200a of the power unit 200 and until further downward than a surface of the foot pedal 310, in the up-down direction U-D of the straddle-type vehicle 10. The surface of the foot pedal 310 is a face for the rider riding on the seat cushion 400 to place the feet on. Furthermore, as shown in FIG. 1A, FIG. 1B, and FIG. 2, in the front-back direction F-B of the straddle-type vehicle 10, two front side cover portions 322 each are connected behind the central cover portion 321; also, two back side cover portions 324 each are connected behind the two front side cover portions 322. Specifically, a left side of the straddle-type vehicle 10 is taken as an example. As shown in FIG. 2, the left lower side edge 321b and the left upper side edge 321c of the central cover portion 321 are connected to the side edge 323b of the bearing cover portion 323 and the front edge 322c of the upper portion 322a of the front side cover portion 322, respectively; also, a back edge 322g of the upper portion 322a of the front side cover portion 322 is connected to a front edge 324b of the back side cover portion 324.

Figure 4C:
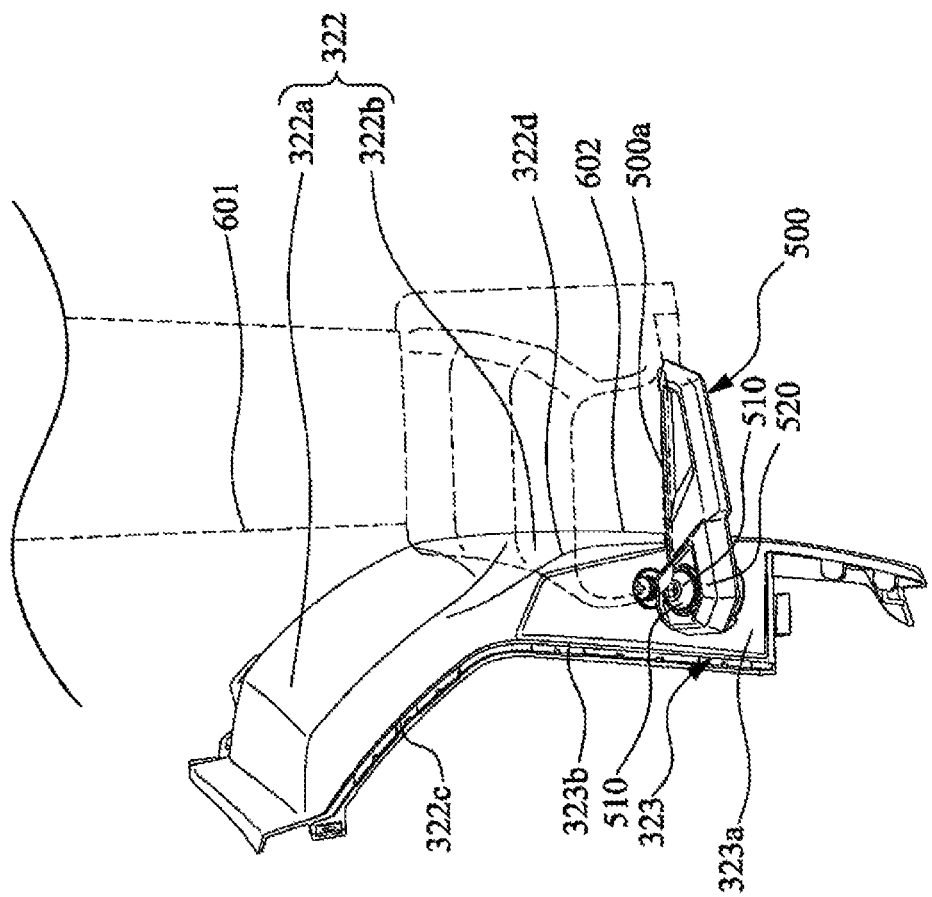
FIG. 4C is a front view in which the foot rest lever is in the expanded state and feet of a co-rider rest on the foot rest lever.
Figure 5:
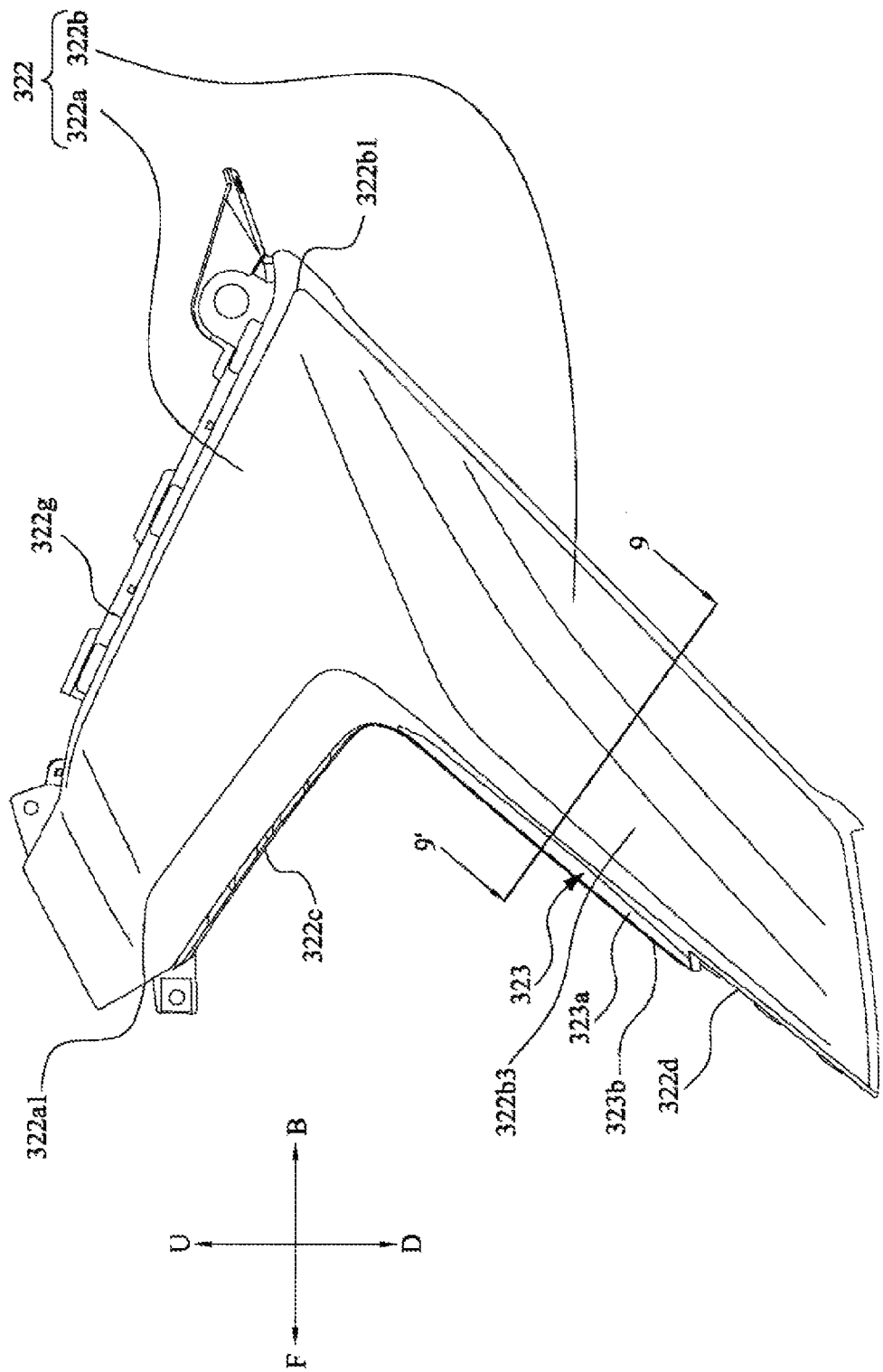
FIG. 5 is a side view of the front side cover portion and the bearing cover portion in FIG. 1A.
Figure 6:
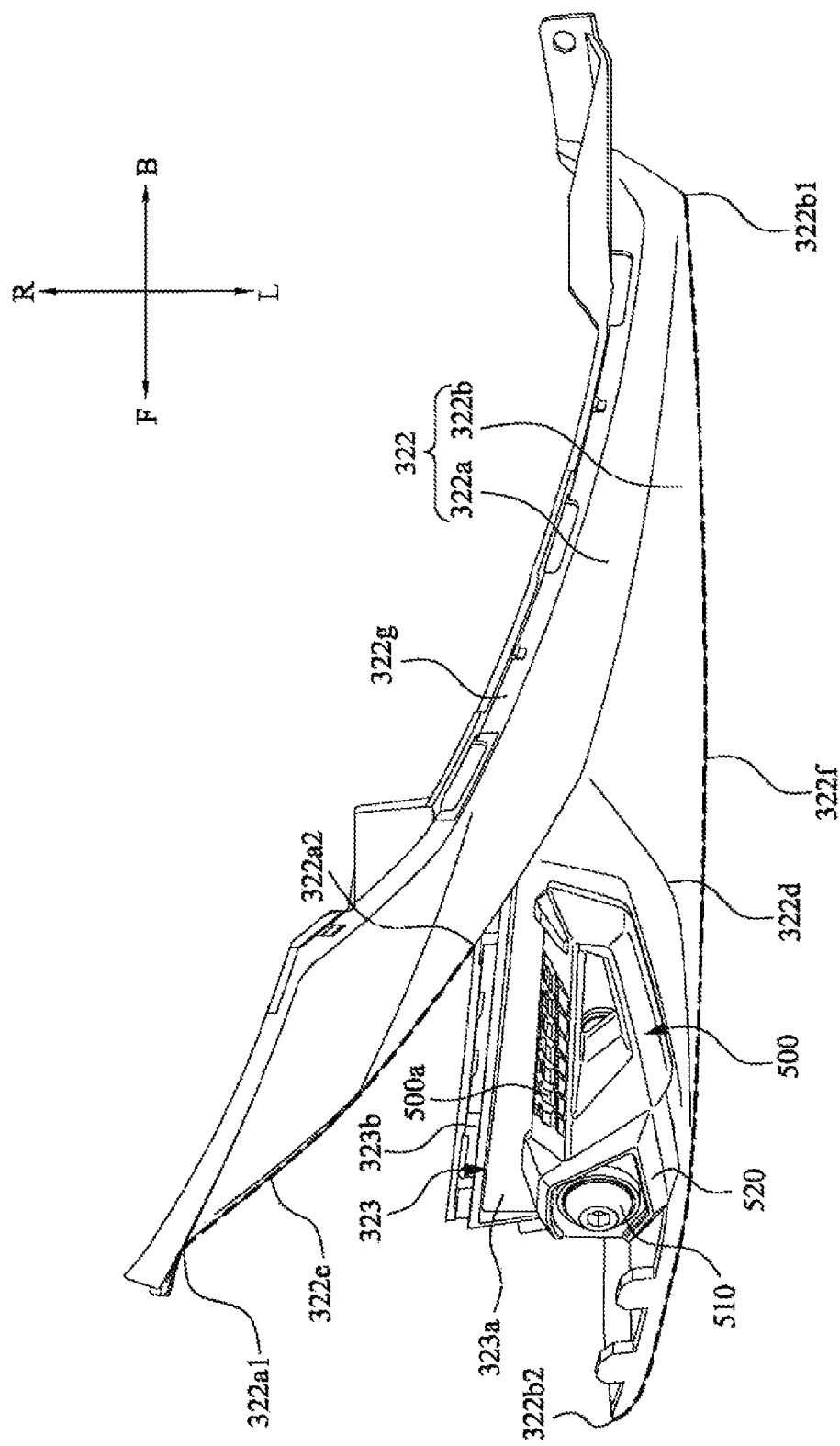
FIG. 6 is a top view of the front side cover portion, the bearing cover portion, and the foot rest lever in FIG. 1A.
Figure 7:
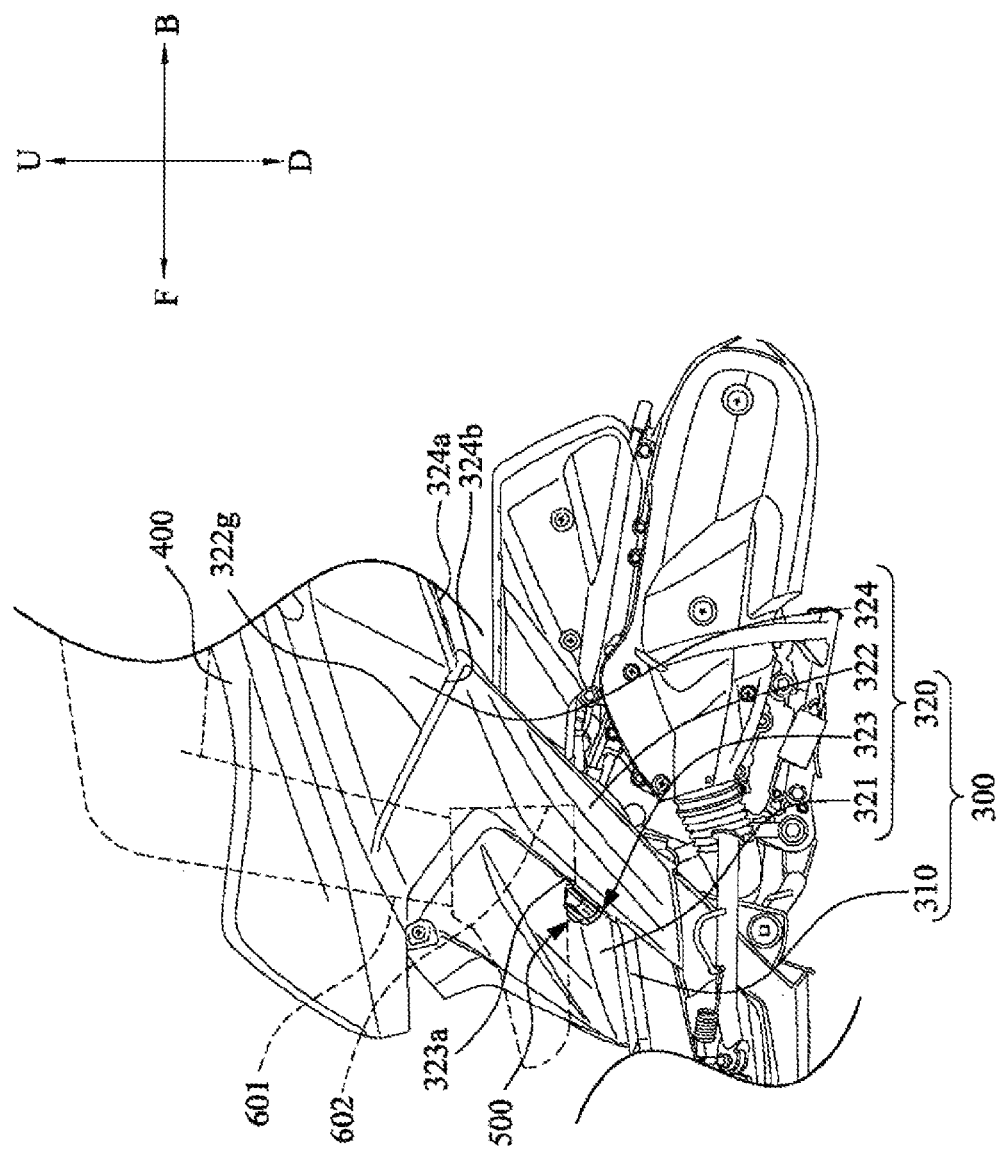
FIG. 7 is a side view of a part of FIG. 1A, in which feet of the co-rider rest on the foot rest lever.

Reference is made to FIG. 4C, FIG. 5, FIG. 6, and FIG. 7. FIG. 4C is a front view in which the foot rest lever is in the expanded state and feet of a co-rider rest on the foot rest lever. FIG. 5 is a side view of the front side cover portion 322 and the bearing cover portion 323 in FIG. 1A. FIG. 6 is a top view of the front side cover portion 322, the bearing cover portion 323, and the foot rest lever 500 in FIG. 1A. FIG. 7 is a side view of a part of FIG. 1A, in which feet of the co-rider rest on the foot rest lever 500.

As shown in FIG. 5 and FIG. 6, the front side cover portion 322 in this embodiment includes the upper portion 322a and a lower portion 322b. When the straddle-type vehicle 10 is viewed sideways, a front end portion 322a1 of the upper portion 322a of the front side cover portion 322 is located further forward than a back end portion 322b1 of the lower portion 322b of the front side cover portion 322 in the front-back direction F-B of the straddle-type vehicle 10; when the straddle-type vehicle 10 is viewed downward, the upper portion 322a is located further inward than the lower portion 322b in the left-right direction L-R of the straddle-type vehicle 10.

Also, as shown in FIG. 5 and FIG. 7, when the straddle-type vehicle 10 is viewed sideways, the front side cover portion 322 in this embodiment is boomerang-shaped. When the straddle-type vehicle 10 is viewed sideways, the front side cover portion 322 in this embodiment is formed by the upper portion 322a of the front side cover portion 322 obliquely extending backward and downward and the lower portion 322b of the front side cover portion 322 obliquely extending forward and downward, wherein the upper portion 322a and the lower portion 322b are consecutive to one another. However, the shape of the front side cover portion 322 of the present invention is not limited to the foregoing shape. For example, in FIG. 2, FIG. 4A, and FIG. 4B, an angle between the side edge 323b of the bearing cover portion 323 and the front edge 322c of the upper portion 322a of the front side cover portion 322 may also be up to 180 degrees. Also, in FIG. 5, an angle between a front edge 322d of the lower portion 322b of the front side cover portion 322 and the front edge 322c of the upper portion 322a of the front side cover portion 322 may also be up to 180 degrees. Also, an angle between the side edge 323b of the bearing cover portion 323 (the front edge 322d of the lower portion 322b of the front side cover portion 322) and the front edge 322c of the upper portion 322a of the front side cover portion 322 may also be smaller than the angle shown in FIG. 5. That is, any variations in shape of the front side cover portion 322 is allowed, as long as the front end portion 322a1 of the upper portion 322a is located further forward than the back end portion 322b1 of the lower portion 322b in the front-back direction F-B of the straddle-type vehicle 10.

As shown in FIG. 1B and FIG. 2, when the straddle-type vehicle 10 is viewed downward, the bearing cover portion 323 is connected between the left lower side edge 321b of the central cover portion 321 and the front edge 322d (shown by a dotted line in FIG. 2) of the lower portion 322b by extending in the left-right direction L-R of the straddle-type vehicle 10, and has the bearing face 323a for bearing the foot rest lever 500 and facing the up direction of the straddle-type vehicle 10.

Additionally, referring back to FIG. 1A, when the straddle-type vehicle 10 is viewed sideways, an imaginary extension line A extending from the bearing face 323a of the bearing cover portion 323 passes through the seat cushion 400. Referring to FIG. 2, FIG. 4A, and FIG. 4B, the imaginary extension line A is a slope of a plane, that is, the bearing face 323a, formed by the side edge 323b of the bearing cover portion 323 and the front edge 322d of the lower portion 322b. That is, the imaginary extension line A obliquely extends backward to pass through the seat cushion 400 in such a manner that the foot rest lever 500 carried by the bearing face 323a can move to a position suitable for supporting the foot of the co-rider. As shown in FIG. 1A, the imaginary extension line A can be appropriately set in a range from an imaginary extension line A' passing through the backmost end of the seat cushion 400 to an imaginary extension line A". Also, when the straddle-type vehicle 10 is viewed sideways, a lower edge 324a (see FIG. 3) of the back side cover portion 324 is located further upward than the power unit 200 in the up-down direction U-D of the straddle-type vehicle 10 and extends backward from the back edge 322g of the upper portion 322a in the front-back direction F-B of the straddle-type vehicle 10.

Furthermore, in the present invention, the bearing face 323a is not limited to a plane. The bearing face 323a may also be a curved surface or a concave-convex surface. On this occasion, in order to appropriately represent the slope of the bearing face 323a, the imaginary extension line A can be appropriately defined. For example, the imaginary extension line A may be a slope between the frontmost end and the backmost end of the bearing face 323a, may also be a slope along an outer edge of the bearing face 323a, and may also be a slope between the pivot 510 of the foot rest lever 500 located above the bearing face 323a and the backmost end of the bearing face 323a.

As shown in FIG. 5, in this embodiment, when the straddle-type vehicle 10 is viewed sideways, the width of the lower portion 322b of the front side cover portion 322 in the front-back direction F-B of the straddle-type vehicle 10 gets greater from the lower end to the upper end.

Furthermore, in the present invention, it is not limited that, the width of the lower portion 322b of the front side cover portion 322 in the front-back direction F-B of the straddle-type vehicle 10 gets greater from the lower end to the upper end, as long as the lower portion 322b of the front side cover portion 322 has an area against which inner sides of heels 602 of the feet can abut.

Figure 9:
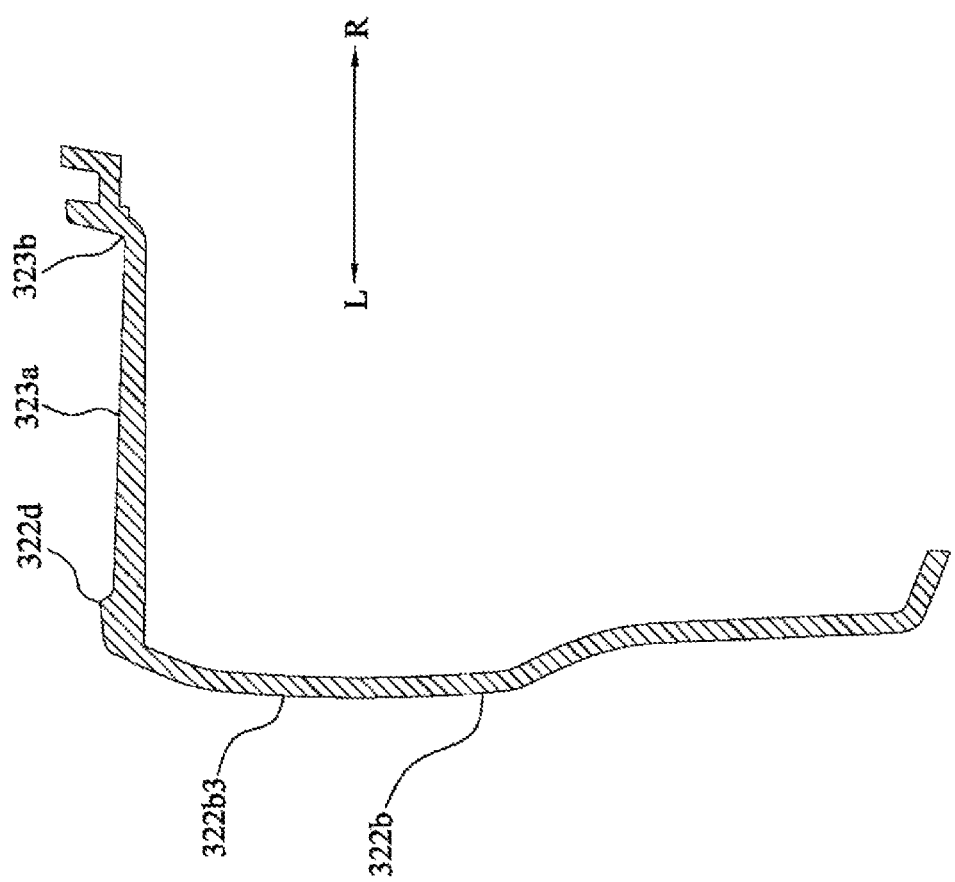
FIG. 9 is a schematic cross-sectional view taken along a line 9-9' in FIG. 5.

As shown in FIG. 5, in this embodiment, a surface of the lower portion 322b of the front side cover portion 322 is of a concave-convex shape. Specifically, a front portion of the lower portion 322b of the front side cover portion 322 is provided with a protrusion 322b3 obliquely extending forward and downward. A center of the protrusion 322b3 of the front side cover portion 322 is located further outward than a front portion and a back portion of the protrusion 322b3. Then, reference is made to FIG. 9. FIG. 9 is a schematic cross-sectional view taken along a line 9-9' in FIG. 5. As shown in FIG. 5 and FIG. 9, in this embodiment, a part of the protrusion 322b3 of the lower portion 322b of the front side cover portion 322 close to the front edge 322d of the lower portion 322b of the front side cover portion 322 protrudes outside in the left-right direction L-R of the straddle-type vehicle 10. That is, the protrusion 322b3 of the front side cover portion 322 is disposed at the front portion of the lower portion 322b of the front side cover portion 322.

Furthermore, in the present invention, the surface of the lower portion 322b of the front side cover portion 322 is not limited to the concave-convex shape, as long as the surface of the lower portion 322b of the front side cover portion 322 is capable of supporting the feet on the foot rest lever 500. Furthermore, in the present invention, unless otherwise indicated, the so-called "surface" refers to a face exposed outside the straddle-type vehicle 10 and refers to a face capable of being seen when the straddle-type vehicle 10 is viewed sideways, forward, and downward.

As shown in FIG. 5, in this embodiment, when the straddle-type vehicle 10 is viewed sideways, the front edge 322c of the upper portion 322a of the front side cover portion 322 substantially obliquely extends backward and downward from the seat cushion 400 in the up-down direction U-D of the straddle-type vehicle 10 and the front-back direction F-B of the straddle-type vehicle 10; the front edge 322d of the lower portion 322b of the front side cover portion 322 substantially obliquely extends forward and downward from the upper portion 322a of the front side cover portion 322 in the up-down direction U-D of the straddle-type vehicle 10 and the front-back direction F-B of the straddle-type vehicle 10 and is connected to the back edge of the foot pedal 310.

Furthermore, in the present invention, it is not limited that, when the straddle-type vehicle 10 is viewed sideways, the front edge 322c of the upper portion 322a of the front side cover portion 322 substantially obliquely extends backward and downward from the seat cushion 400 in the up-down direction U-D of the straddle-type vehicle 10 and the front-back direction F-B of the straddle-type vehicle 10 and the front edge 322d of the lower portion 322b of the front side cover portion 322 substantially obliquely extends forward and downward from the upper portion 322a of the front side cover portion 322 in the up-down direction U-D of the straddle-type vehicle 10 and the front-back direction F-B of the straddle-type vehicle 10 and is connected to the back edge of the foot pedal 310, as long as the front end portion 322a1 of the upper portion 322a is located further forward than the back end portion 322b1 of the lower portion 322b in the front-back direction F-B of the straddle-type vehicle 10.

As shown in FIG. 6, in this embodiment, when the straddle-type vehicle 10 is viewed downward, the front end portion 322a1 of the upper portion 322a of the front side cover portion 322 is located further inward than the back end portion (which in this embodiment is the same position as the back end portion 322b1 of the lower portion 322b) of the upper portion 322a of the front side cover portion 322 in the left-right direction L-R of the straddle-type vehicle 10, and the front end portion 322a1 of the upper portion 322a of the front side cover portion 322 is located further inward than the front edge 322d of the lower portion 322b of the front side cover portion 322 in the left-right direction L-R of the straddle-type vehicle 10.

Furthermore, in the present invention, it is not limited that, when the straddle-type vehicle 10 is viewed downward, the front end portion 322a1 of the upper portion 322a of the front side cover portion 322 is located further inward than the back end portion of the upper portion 322a of the front side cover portion 322 in the left-right direction L-R of the straddle-type vehicle 10, and the front end portion 322a1 of the upper portion 322a of the front side cover portion 322 is located further inward than the front edge 322d of the lower portion 322b of the front side cover portion 322 in the left-right direction L-R of the straddle-type vehicle 10, as long as when the straddle-type vehicle 10 is viewed sideways, the upper portion 322a is located further inward than the lower portion 322b in the left-right direction L-R of the straddle-type vehicle 10.

As shown in FIG. 6, in this embodiment, when the straddle-type vehicle 10 is viewed downward, the bearing cover portion 323 is located further outward than an outer edge portion 322e (shown by a dotted line at the upper part in FIG. 6) of the front portion of the upper portion 322a of the front side cover portion 322 in the left-right direction L-R of the straddle-type vehicle 10. The outer edge portion 322e of the front portion of the upper portion 322a of the front side cover portion 322 is a line segment from the front end portion 322a1 of the upper portion 322a of the front side cover portion 322 to a back end portion 322a2 (when the straddle-type vehicle 10 is viewed downward, an intersection point of the upper portion 322 and the bearing cover portion 323) of the front portion of the upper portion 322a of the front side cover portion 322.

As shown in FIG. 6, in this embodiment, when the straddle-type vehicle 10 is viewed downward, the foot rest lever 500 is located further outward than the upper portion 322a of the front side cover portion 322 in the left-right direction L-R of the straddle-type vehicle 10.

As shown in FIG. 6, in this embodiment, the foot rest lever 500 has the pivotal connection portion 520. The pivotal connection portion 520 is disposed on the bearing face 323a. When the straddle-type vehicle 10 is viewed downward, the pivotal connection portion 520 is located further inward than an outer edge portion 322f (shown by a dotted line at the lower part in FIG. 6) of the lower portion 322b of the front side cover portion 322 in the left-right direction L-R of the straddle-type vehicle 10. The outer edge portion 322f of the lower portion 322b of the front side cover portion 322 is a line segment from a front end portion 322b2 of the lower portion 322b of the front side cover portion 322 to the back end portion 322b1 of the lower portion 322b of the front side cover portion 322.

Figure 8:
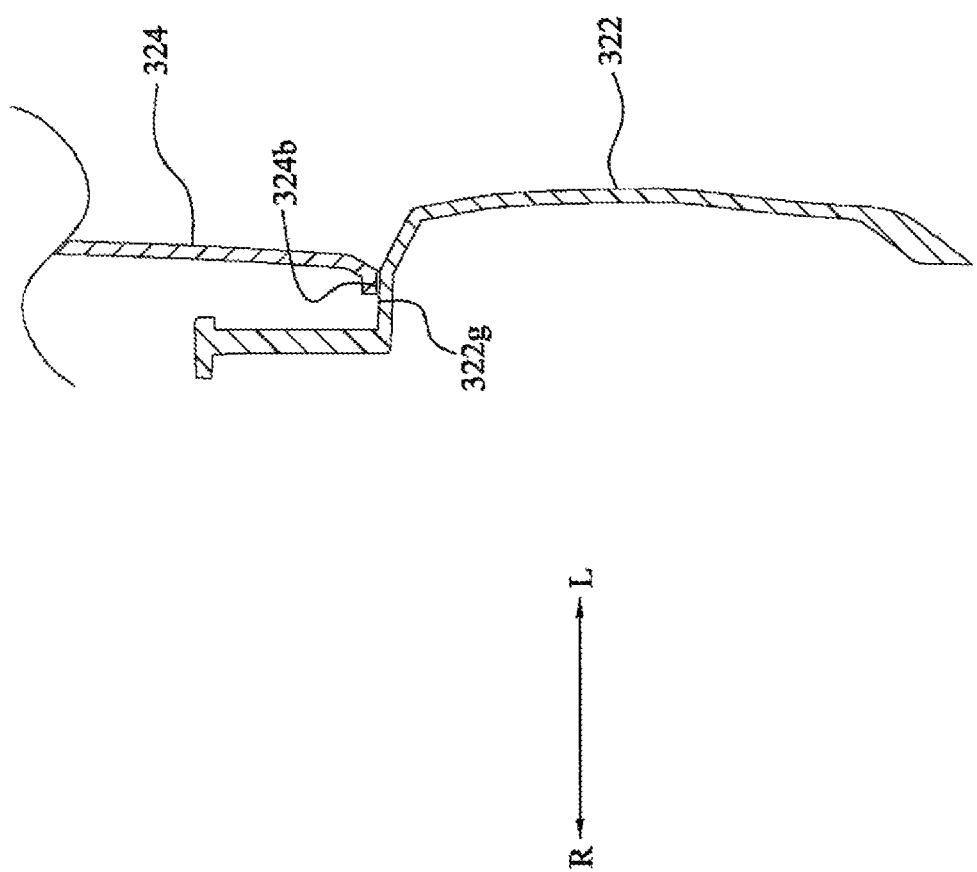
FIG. 8 is a schematic cross-sectional view taken along a line 8-8' in FIG. 3.

Referring to FIG. 8, a schematic cross-sectional view taken along a line 8-8' in FIG. 3 is shown. As shown in FIG. 3 and FIG. 8, in this embodiment, the back edge 322g of the upper portion 322a of the front side cover portion 322 is connected to the front edge 324b of the back side cover portion 324 to form a segment difference, which may be a step between the back edge 322g and the front edge 324b, and when the straddle-type vehicle 10 is viewed downward, the upper portion 322a of the front side cover portion 322 is located further outward than the back side cover portion 324 in the left-right direction L-R of the straddle-type vehicle 10.

Furthermore, in the present invention, it is not limited that, the back edge 322g of the upper portion 322a of the front side cover portion 322 is connected to the front edge 324b of the back side cover portion 324 to form a segment difference and when the straddle-type vehicle 10 is viewed downward, the upper portion 322a of the front side cover portion 322 is located further outward than the back side cover portion 324 in the left-right direction L-R of the straddle-type vehicle 10, as long as the co-rider can use the inner sides of the heels of the feet to clamp an upper part of the lower portion 322b of the front side cover portion 322 to improve stability.

As shown in FIG. 3, in this embodiment, in the case that the foot rest lever 500 is in the received state, when the straddle-type vehicle 10 is viewed sideways, the height h of the foot rest lever 500 in the up-down direction U-D of the straddle-type vehicle 10 is greater than the length 1 of the foot rest lever 500 in the front-back direction F-B of the straddle-type vehicle 10. For example, the height h is a length between a horizontal line passing through an upper end of the foot rest lever 500 and a horizontal line passing through a lower end thereof when the straddle-type vehicle 10 is viewed sideways. Also, the length 1 is a length between a perpendicular line passing through a front end of the foot rest lever 500 and a perpendicular line passing through a back end thereof when the straddle-type vehicle 10 is viewed sideways.

Furthermore, in the present invention, in the case that the foot rest lever 500 is in the received state, when the straddle-type vehicle 10 is viewed sideways, it is not limited that the height h of the foot rest lever 500 in the up-down direction U-D of the straddle-type vehicle 10 is greater than the length 1 of the foot rest lever 500 in the front-back direction F-B of the straddle-type vehicle 10, so long as the co-rider can apply force when switching the foot rest lever 500 to the expanded state.

As shown in FIG. 1A, in this embodiment, when the foot rest lever 500 is in the received state, the foot rest lever 500 is located above the bearing face 323a and is substantially parallel to the bearing face 323a.

A straddle-type vehicle 10 in one embodiment of the present invention comprises a body frame 100, a power unit 200, a seat cushion 400, a foot rest lever 500, and a vehicle shell 300.

The power unit 200 is freely swingably supported on the body frame 100. The seat cushion 400 is located higher than the power unit 200. The foot rest lever 500 is supported on the body frame 100 in such a manner that the foot rest lever 500 is rotatable about a pivot 510. The foot rest lever 500 has a foot carrying face 500a switchable between a received state and an expanded state. The vehicle shell 300 covers the body frame 100 and includes a foot pedal 310 and a back shell portion 320. The foot pedal 310 is located before and below the seat cushion 400 and before the power unit 200. The back shell portion 320 is connected to a back edge of the foot pedal 310.

When the straddle-type vehicle 10 is viewed sideways, the back shell portion 320 is located below the seat cushion 400 in a manner of dividing the space below the seat cushion 400. The back shell portion 320 includes a central cover portion 321, a front side cover portion 322, a bearing cover portion 323, and a back side cover portion 324.

The central cover portion 321 is connected to the back edge of the foot pedal 310. When the straddle-type vehicle 10 is viewed downward, a center of the front edge 321a of the central cover portion 321 is located further forward in the front-back direction of the straddle-type vehicle 10, while two ends of the front edge 321a of the central cover portion 321 are located further backward in front-back direction of the straddle-type vehicle 10. When the straddle-type vehicle 10 is viewed sideways, the front side cover portion 322 is located behind the central cover portion 321 and extends from a lower end of the seat cushion 400 until further downward than an upper end portion 200a of the power unit 200 in the up-down direction of the straddle-type vehicle 10. A front end portion 322a1 of an upper portion 322a of the front side cover portion 322 is located further forward than a back end portion 322b1 of a lower portion 322b of the front side cover portion 322 in the front-back direction of the straddle-type vehicle 10. When the straddle-type vehicle 10 is viewed downward, the upper portion 322a of the front side cover portion 322 is located further inward than the lower portion 322b of the front side cover portion 322 in the in the left-right direction of the straddle-type vehicle 10. When the straddle-type vehicle 10 is viewed downward, the bearing cover portion 323 is connected between a lower side edge (a left lower side edge 321b in an example of a left side of the straddle-type vehicle) of the central cover portion 321 and a front edge 322d of the lower portion 322b of the front side cover portion 322 by extending in the left-right direction of the straddle-type vehicle 10, and has a bearing face 323a for bearing the foot rest lever 500 and facing the up direction of the straddle-type vehicle 10. When the straddle-type vehicle 10 is viewed sideways, an imaginary extension line A extending from the bearing face 323a passes through the seat cushion 400. When the straddle-type vehicle 10 is viewed sideways, a lower edge of the back side cover portion 324 is located above the power unit 200 and extends backward from a back edge 322g of the upper portion 322a of the front side cover portion 322.

Therefore, as shown in FIG. 4C and FIG. 7, according to this structure arrangement, when feet of a co-rider rests on the foot rest lever 500, a heel 602 of the co-rider easily abuts against the lower portion 322b of the front side cover portion 322, achieving good foot bearing comfort. In particular, in the present invention, the upper portion 322a of the front side cover portion 322 is located further inward than the lower portion 322b in the left-right direction L-R of the straddle-type vehicle 10 without affecting a shank 601 of the co-rider. Furthermore, the lower portion 322b of the front side cover portion 322 is located further outward than the upper portion 322a in the left-right direction L-R of the straddle-type vehicle 10 so that when the feet rests on the foot rest lever 500 in the expanded state, heels 602 of two feet (parts near shoes) of the co-rider easily clamp, from the outside, the lower portions 322b of the front side cover portions 322 located at two sides of the straddle-type vehicle 10, thereby ensuring the comfort of the shank 601 and the stability of the feet of the co-rider and increases the foot comfort.

Also, as shown in FIG. 1B and FIG. 2, according to this structure arrangement, in the present invention, the foot rest lever 500 can be disposed on the bearing face 323a of the bearing cover portion 323 facing the up direction of the straddle-type vehicle 10 without being shielded by the back shell portion 320, so that a pivot 510 of the foot rest lever 500 is exposed towards the up direction of the straddle-type vehicle 10, thereby achieving good operability.

Furthermore, the shape of the front side cover portion 322 of the present invention is not limited to the foregoing shape. For example, in FIG. 2, FIG. 4A, and FIG. 4B, an angle between a side edge 323b of the bearing cover portion 323 and a front edge 322c of the upper portion 322a of the front side cover portion 322 may also be up to 180 degrees. Also, in FIG. 5, an angle between a front edge 322d of the lower portion 322b of the front side cover portion 322 and the front edge 322c of the upper portion 322a of the front side cover portion 322 may also be up to 180 degrees. Also, an angle between a side edge 323b of the bearing cover portion 323 (the front edge 322d of the lower portion 322b of the front side cover portion 322) and the front edge 322c of the upper portion 322a of the front side cover portion 322 may also be smaller than the angle shown in FIG. 5. That is, any variations in shape of the front side cover portion 322 is allowed, as long as the front end portion 322a1 of the upper portion 322a is located further forward than the back end portion 322b1 of the lower portion 322b in the front-back direction F-B of the straddle-type vehicle 10.

Furthermore, in the present invention, the bearing face 323a is not limited to a plane. The bearing face 323a may also be a curved surface or a concave-convex surface. On this occasion, in order to appropriately represent the slope of the bearing face 323a, the imaginary extension line A can be appropriately defined. For example, the imaginary extension line A may be a slope between the frontmost end and the backmost end of the bearing face 323a, may also be a slope along an outer edge of the bearing face 323a, and may also be a slope between the pivot 510 of the foot rest lever 500 located above the bearing face 323a and the backmost end of the bearing face 323a.

In a straddle-type vehicle 10 in one embodiment of the present invention, when the straddle-type vehicle 10 is viewed sideways, the width of the lower portion 322b of the front side cover portion 322 in the front-back direction F-B of the straddle-type vehicle 10 gets greater from the lower end to the upper end.

Therefore, as shown in FIG. 5, according to this structure arrangement, when feet of the co-rider rests on the foot rest lever 500 in the expanded state, the co-rider uses inner sides of the heels 602 of the feet to clamp an upper part of the lower portion 322b of the front side cover portion 322 to achieve stable feeling. Greater is the width of the upper part of the lower portion 322b of the front side cover portion 322 in the front-back direction F-B of the straddle-type vehicle 10, larger is the area for the inner sides of the heels 602 of the feet to abut against. Thus, stable feeling of the feet can be improved no matter what the size of the feet of the co-rider is, thereby improving the comfort.

Furthermore, in the present invention, it is not limited that, the width of the lower portion 322b of the front side cover portion 322 in the front-back direction F-B of the straddle-type vehicle 10 gets greater from the lower end to the upper end, as long as the lower portion 322b of the front side cover portion 322 has an area against which the inner sides of the heels 602 of the feet can abut.

In the straddle-type vehicle 10 in one embodiment of the present invention, a surface of the lower portion 322b of the front side cover portion 322 is of a concave-convex shape.

Therefore, as shown in FIG. 5, according to this structure arrangement, the concave-convex structure on the surface of the lower portion 322b of the front side cover portion 322 can improve the rigidity of the lower portion 322b. A convex portion of the concave-convex structure can strengthen the support towards the outside to indeed support the feet on the foot rest lever 500, thereby further improving the stable feeling of the feet and improving the comfort.

Furthermore, in the present invention, the surface of the lower portion 322b of the front side cover portion 322 is not limited to the concave-convex shape, as long as the surface of the lower portion 322b of the front side cover portion 322 can support the feet on the foot rest lever 500.

In a straddle-type vehicle 10 in one embodiment of the present invention, when the straddle-type vehicle 10 is viewed sideways, the front edge 322c of the upper portion 322a of the front side cover portion 322 substantially obliquely extends backward and downward from the seat cushion 400 in the up-down direction of the straddle-type vehicle 10 and the front-back direction of the straddle-type vehicle 10; the front edge 322d of the lower portion 322b of the front side cover portion 322 substantially obliquely extends forward and downward from the upper portion 322a of the front side cover portion 322 in the up-down direction of the straddle-type vehicle 10 and the front-back direction of the straddle-type vehicle 10 and is connected to the back edge of the foot pedal 310.

Therefore, as shown in FIG. 5, according to this structure arrangement, a central part of the front side cover portion 322 in the up-down direction U-D of the straddle-type vehicle 10 has a shape of substantially a boomerang protruding backward of the straddle-type vehicle 10, thereby improving the rigidity of the front side cover portion 322, strengthening the support towards the outside to indeed support the feet on the foot rest lever 500, and thus further improving the stable feeling of the feet and improving the comfort.

Furthermore, in the present invention, it is not limited that, when the straddle-type vehicle 10 is viewed sideways, the front edge 322c of the upper portion 322a of the front side cover portion 322 substantially obliquely extends backward and downward from the seat cushion 400 in the up-down direction U-D of the straddle-type vehicle 10 and the front-back direction F-B of the straddle-type vehicle 10, and the front edge 322d of the lower portion 322b of the front side cover portion 322 substantially obliquely extends forward and downward from the upper portion 322a of the front side cover portion 322 in the up-down direction U-D of the straddle-type vehicle 10 and the front-back direction F-B of the straddle-type vehicle 10 and is connected to the back edge of the foot pedal 310, as long as the front end portion 322a1 of the upper portion 322a is located further forward than the back end portion 322b1 of the lower portion 322b in the front-back direction F-B of the straddle-type vehicle 10.

In a straddle-type vehicle 10 in one embodiment of the present invention, when the straddle-type vehicle 10 is viewed downward, the front end portion 322a1 of the upper portion 322a of the front side cover portion 322 is located further inward than the back end portion 322b1 of the upper portion 322a of the front side cover portion 322 in the left-right direction of the straddle-type vehicle 10, and the front end portion 322a1 of the upper portion 322a of the front side cover portion 322 is located further inward than the front edge 322d of the lower portion 322b of the front side cover portion 322 in the left-right direction of the straddle-type vehicle 10.

Therefore, as shown in FIG. 6, according to this structure arrangement, the front end portion 322a1 of the upper portion 322a of the front side cover portion 322 is located further inward than the back end portion in the left-right direction L-R of the straddle-type vehicle 10, so that the feet on the foot rest lever 500 is relatively close to the lower portion 322b of the front side cover portion 322, and thus heels 602 of two feet of the co-rider easily clamp, from the outside, the lower portions 322b of the front side cover portions 322 located at two sides of the straddle-type vehicle 10, so as to ensure the stable feeling of the feet. On the other hand, the front end portion 322a1 of the upper portion 322a of the front side cover portion 322 is located further inward than the front edge 322d of the lower portion 322b in the left-right direction L-R of the straddle-type vehicle 10, so that ankles 601 of the co-rider may not contact the upper portion 322a, thereby further improving the comfort of the feet of the co-rider.

Furthermore, in the present invention, it is not limited that, when the straddle-type vehicle 10 is viewed downward, the front end portion 322a1 of the upper portion 322a of the front side cover portion 322 is located further inward than the back end portion of the upper portion 322a of the front side cover portion 322 in the left-right direction L-R of the straddle-type vehicle 10, and the front end portion 322a1 of the upper portion 322a of the front side cover portion 322 is located further inward than the front edge 322d of the lower portion 322b of the front side cover portion 322 in the left-right direction L-R of the straddle-type vehicle 10, as long as when the straddle-type vehicle 10 is viewed sideways, the upper portion 322a is located further inward than the lower portion 322b in the left-right direction L-R of the straddle-type vehicle 10.

In a straddle-type vehicle 10 in one embodiment of the present invention, when the straddle-type vehicle 10 is viewed downward, the bearing cover portion 323 is located further outward than the outer edge portion 322e of the front portion of the upper portion 322a of the front side cover portion 322 in the left-right direction of the straddle-type vehicle 10.

Therefore, as shown in FIG. 6, according to this structure arrangement, if the bearing cover portion 323 is disposed further outward than the outer edge portion 322e of the front portion of the upper portion 322a of the front side cover portion 322, the foot rest lever 500 disposed on the bearing face 323a of the bearing cover portion 323 is also disposed at the outside. Thus, when the straddle-type vehicle 10 is viewed downward, the foot rest lever 500 is exposed out of the back shell portion 320, thereby improving the operability of the foot rest lever 500.

In a straddle-type vehicle 10 in one embodiment of the present invention, when the straddle-type vehicle 10 is viewed downward, the foot rest lever 500 is located further outward than the upper portion 322a of the front side cover portion 322 in the left-right direction of the straddle-type vehicle 10.

Therefore, as shown in FIG. 6, according to this structure arrangement, when the straddle-type vehicle 10 is viewed downward, the foot rest lever 500 is disposed further outward than the upper portion 322a of the front side cover portion 322. Thus, when the straddle-type vehicle 10 is viewed downward, the foot rest lever 500 is exposed out of the back shell portion 320, thereby improving the operability of the foot rest lever 500.

In a straddle-type vehicle 10 in one embodiment of the present invention, the foot rest lever 500 has a pivotal connection portion 520. The pivotal connection portion 520 is disposed on the bearing face 323a. When the straddle-type vehicle 10 is viewed downward, the pivotal connection portion 520 is located further inward than the outer edge portion 322f of the lower portion 322b of the front side cover portion 322 in the left-right direction of the straddle-type vehicle 10.

Therefore, as shown in FIG. 6, according to this structure arrangement, the foot rest lever 500 in the expanded state extends towards the outside of the outer edge portion 322f of the lower portion 322b from the pivot 510 located in the inner side of the outer edge portion 322f of the lower portion 322b in the left-right direction L-R of the straddle-type vehicle 10, such that the feet on the foot rest lever 500 are relatively close to the lower portion 322b of the front side cover portion 322. Therefore, the heels 602 of two feet of the co-rider easily clamp, from the outside, the lower portions 322b of the front side cover portions 322 located at two sides of the straddle-type vehicle 10, so as to ensure stability for the feet.

In a straddle-type vehicle 10 in one embodiment of the present invention, the back edge 322g of the upper portion 322a of the front side cover portion 322 is connected to the front edge 324b of the back side cover portion 324 to form a segment difference and when the straddle-type vehicle 10 is viewed downward, the upper portion 322a of the front side cover portion 322 is located further outward than the back side cover portion 324 in the left-right direction of the straddle-type vehicle 10.

Therefore, as shown in FIG. 8, according to this structure arrangement, a segment difference is formed between the back edge 322g of the upper portion 322a of the front side cover portion 322 and the front edge 324b of the back side cover portion 324 and the front side cover portion 322 protrudes towards the outside, so that the feet on the foot rest lever 500 is relatively close to the front side cover portion 322. Therefore, the heels of two feet of the co-rider easily clamp, from the outside, the lower portions 322b of the front side cover portions 322 located at two sides of the straddle-type vehicle 10, so as to further ensure stability for the feet.

Furthermore, in the present invention, it is not limited that, the back edge 322g of the upper portion 322a of the front side cover portion 322 is connected to the front edge 324b of the back side cover portion 324 to form a segment difference and when the straddle-type vehicle 10 is viewed downward, the upper portion 322a of the front side cover portion 322 is located further outward than the back side cover portion 324 in the left-right direction L-R of the straddle-type vehicle 10, as long as the co-rider can use the inner sides of the heels 602 of the feet to clamp an upper part of the lower portion 322b of the front side cover portion 322 to improve stability.

In a straddle-type vehicle 10 in one embodiment of the present invention, in the case that the foot rest lever 500 is in the received state, when the straddle-type vehicle 10 is viewed sideways, the height h of the foot rest lever 500 in the up-down direction of the straddle-type vehicle 10 is greater than the length l of the foot rest lever 500 in the front-back direction of the straddle-type vehicle 10.

Therefore, as shown in FIG. 3, according to this structure arrangement, the foot rest lever 500 in the received state is very obliquely arranged, so that the co-rider easily applies a force when switching the foot rest lever 500 to the expanded state and thus the operability of the foot rest lever 500 is improved.

Furthermore, in the present invention, in the case that the foot rest lever 500 is in the received state, when the straddle-type vehicle 10 is viewed sideways, it is not limited that the height h of the foot rest lever 500 in the up-down direction U-D of the straddle-type vehicle 10 is greater than the length l of the foot rest lever 500 in the front-back direction F-B of the straddle-type vehicle 10, as long as the co-rider can apply a force when switching the foot rest lever 500 to the expanded state.

In a straddle-type vehicle 10 in one embodiment of the present invention, when the foot rest lever 500 is in the received state, the foot rest lever 500 is located above the bearing face 323a and is substantially parallel to the bearing face 323a.

Therefore, as shown in FIG. 1A, according to this structure arrangement, the foot rest lever 500 is very obliquely arranged, and thus the bearing face 323a parallel to the foot rest lever 500 also has a steep angle, so that the front edge 322d of the lower portion 322b of the front side cover portion 322 parallel to the bearing face 323a is also of a steep shape and thus the feet on the foot rest lever 500 are relatively close to the lower portion 322b of the front side cover portion 322. Therefore, the co-rider easily applies a force when switching the foot rest lever 500 to the expanded state so that the operability of the foot rest lever 500 is improved.

The specific embodiments of the present invention are described in detail in the foregoing. It is clearly known from the description that the present invention is intended to provide a straddle-type vehicle, wherein the back shell portion of the straddle-type vehicle can take account of both the operability of the foot rest lever and the foot bearing comfort. Specifically, in the present invention, the good operability can be achieved by disposing the foot rest lever on the bearing face of the bearing cover portion facing the up direction of the straddle-type vehicle without being shielded by the back shell portion, so that the pivot of the foot rest lever is exposed towards the up direction of the straddle-type vehicle. Moreover, in the present invention, the upper portion of the front side cover portion is located further inward than the lower portion in the left-right direction of the straddle-type vehicle without affecting shanks of the co-rider, and the lower portion of the front side cover portion is located further outward than the upper portion in the left-right direction of the straddle-type vehicle so that when feet of the co-rider rest on the foot rest lever in the expanded state, heels of two feet (parts near shoes) of the co-rider easily clamp, from the outside, the lower portions of the front side cover portions located at two sides of the straddle-type vehicle, thereby ensuring the comfort of the shanks and the stability of the feet of the co-rider and thus achieving good foot bearing comfort.

The present invention has been disclosed through the foregoing embodiments, but is not intended to be limited thereto. Various variations and modifications can be made by persons skilled in the art without departing from the spirit and scope of the present invention. Therefore, the protection scope of the present invention is defined by the appended claims.

The invention claimed is:
1. A straddle-type vehicle, comprising:
a body frame;
a power unit freely swingably supported on the body frame;
a seat cushion located higher than the power unit;
a foot rest lever being rotatably supported on the body frame using a pivot and the foot rest lever having a foot carrying face switchable between a received state and an expanded state; and
a vehicle shell covering the body frame and comprising a foot pedal and a back shell portion, the foot pedal being located forward of and below the seat cushion, the foot pedal further being located forward of the power unit, the back shell portion being connected to a back edge of the foot pedal, wherein when the straddle-type vehicle is viewed sideways, the back shell portion is located below the seat cushion so as to divide a space below the seat cushion, the back shell portion including:
a central cover portion connected to the back edge of the foot pedal, when the straddle-type vehicle is viewed from the top, a center of a front edge of the central cover portion is located further forward in the front-back direction of the straddle-type vehicle than two ends of the front edge of the central cover portion;
a front side cover portion, when the straddle-type vehicle is viewed sideways,
the front side cover portion is located further rearward in the front-back direction than the central cover portion and extends from a lower end of the seat cushion in the up-down direction of the straddle-type vehicle so that the front side cover portion is further downward than an upper end portion of the power unit, and
a front end portion of an upper portion of the front side cover portion is located further forward in the front-back direction of the straddle-type vehicle than a back end portion of a lower portion of the front side cover portion, and
when the straddle-type vehicle is viewed from the top, the upper portion of the front side cover portion is located further inward than the lower portion of the front side cover portion in the left-right direction of the straddle-type vehicle;
a bearing cover portion, when the straddle-type vehicle is viewed from the top, the bearing cover portion is connected between a lower side edge of the central cover portion and a front edge of the lower portion of the front side cover portion by extending in the left-right direction of the straddle-type vehicle, the bearing cover portion has a bearing face for bearing the foot rest lever and facing upwards, and when the straddle-type vehicle is viewed sideways, an imaginary extension line extending from the bearing face passes through the seat cushion; and
a back side cover portion, when the straddle-type vehicle is viewed sideways, a lower edge of the back side cover portion is located above the power unit and extends backward from a back edge of the upper portion of the front side cover portion.

2. The straddle-type vehicle according to claim 1, wherein when the straddle-type vehicle is viewed sideways, a width of the lower portion of the front side cover portion in the front-back direction of the straddle-type vehicle increases from a lower end of the lower portion of the front side cover portion to an upper end of the lower portion of the front side cover portion.

3. The straddle-type vehicle according to claim 1, wherein a surface of the lower portion of the front side cover portion is of a concave-convex shape.

4. The straddle-type vehicle according to claim 1,
wherein when the straddle-type vehicle is viewed sideways,
a front edge of the upper portion of the front side cover portion substantially obliquely extends backward and downward from the seat cushion in the up-down direction of the straddle-type vehicle and the front-back direction of the straddle-type vehicle;
the front edge of the lower portion of the front side cover portion substantially obliquely extends forward and downward from the upper portion of the front side cover portion in the up-down direction of the straddle-type vehicle and the front-back direction of the straddle-type vehicle,
further wherein the front edge of the lower portion of the front side cover portion is connected to the back edge of the foot pedal.

5. The straddle-type vehicle according to claim 1, wherein when the straddle-type vehicle is viewed from the top,
the front end portion of the upper portion of the front side cover portion is located further inward in the left-right direction of the straddle-type vehicle than a back end portion of the upper portion of the front side cover portion, and
the front end portion of the upper portion of the front side cover portion is located further inward in the left-right direction of the straddle-type vehicle than the front edge of the lower portion of the front side cover portion.

6. The straddle-type vehicle according to claim 1, wherein when the straddle-type vehicle is viewed from the top, the bearing cover portion is located further outward in the left-right direction of the straddle-type vehicle than an outer edge portion of a front portion of the upper portion of the front side cover portion.

7. The straddle-type vehicle according to claim 1, wherein when the straddle-type vehicle is viewed from the top, the foot rest lever is located further outward in the left-right direction of the straddle-type vehicle than the upper portion of the front side cover portion.

8. The straddle-type vehicle according to claim 1, wherein the foot rest lever has a pivotal connection portion, the pivotal connection portion is disposed on the bearing face, and when the straddle-type vehicle is viewed from the top, the pivotal connection portion is located further inward in the left-right direction of the straddle-type vehicle than an outer edge portion of the lower portion of the front side cover portion.

9. The straddle-type vehicle according to claim 1, wherein the back edge of the upper portion of the front side cover portion is connected to a front edge of the back side cover portion to form a segment difference, and when the straddle-type vehicle is viewed from the top, the upper portion of the front side cover portion is located further outward in the left-right direction of the straddle-type vehicle than the back side cover portion.

10. The straddle-type vehicle according to claim 1, wherein when the foot rest lever is in the received state, and the straddle-type vehicle is viewed sideways, the height of the foot rest lever in the up-down direction of the straddle-type vehicle is greater than the length of the foot rest lever in the front-back direction of the straddle-type vehicle.

11. The straddle-type vehicle according to claim 10, wherein when the foot rest lever is in the received state, the foot rest lever is located above the bearing face and is substantially parallel to the bearing face.

* * * * *